H. L. ZABRISKIE & G. C. MARX.
PORTABLE MOTOR SUPPORT.
APPLICATION FILED MAY 10, 1916.
1,207,828.
Patented Dec. 12, 1916.
2 SHEETS—SHEET 1.
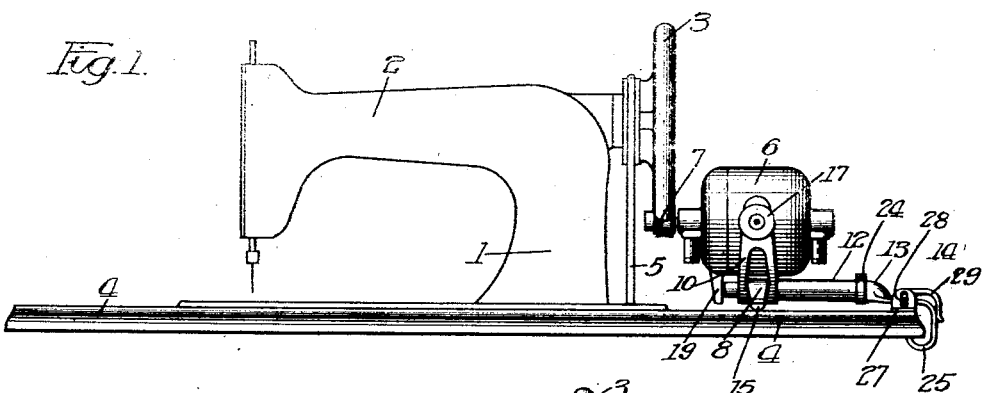
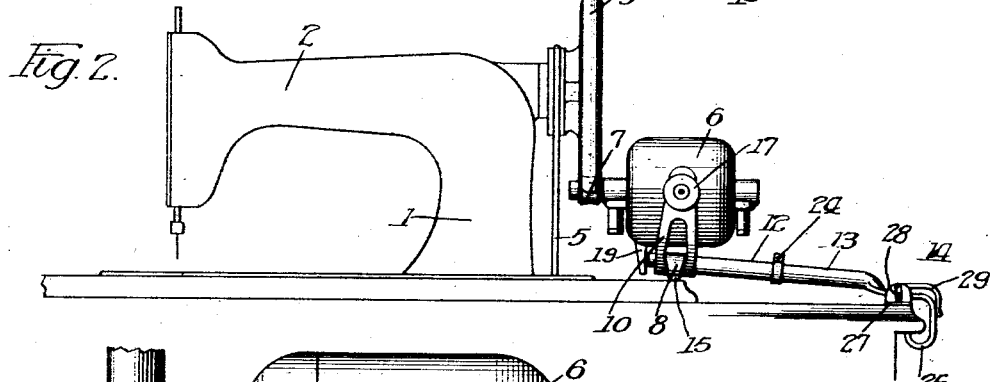
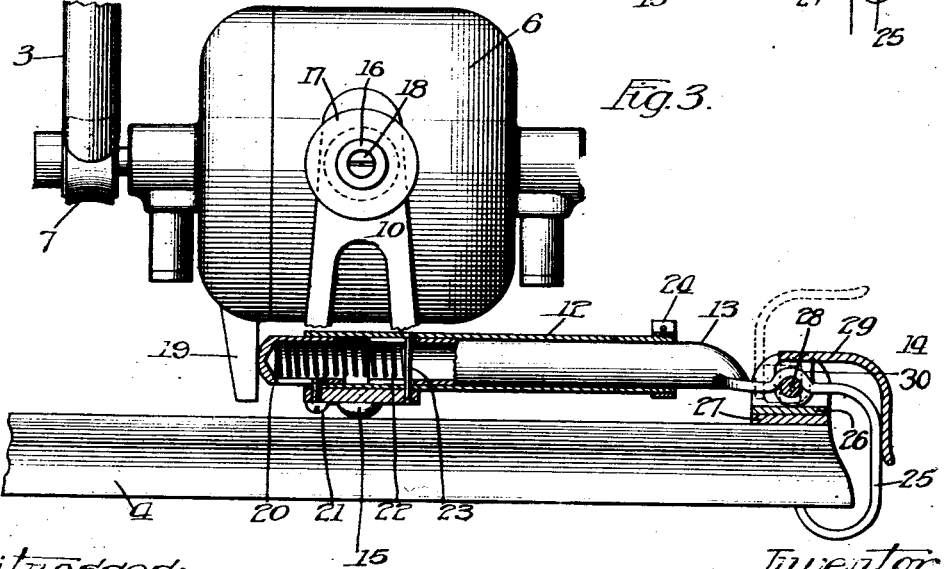
Inventor
Henry L. Zabriskie
Gustav C. Marx H. L. ZABRISKIE & G. C. MARX.
PORTABLE MOTOR SUPPORT.
APPLICATION FILED MAY 10, 1916.
1,207,828.
Patented Dec. 12, 1916.
2 SHEETS—SHEET 2.
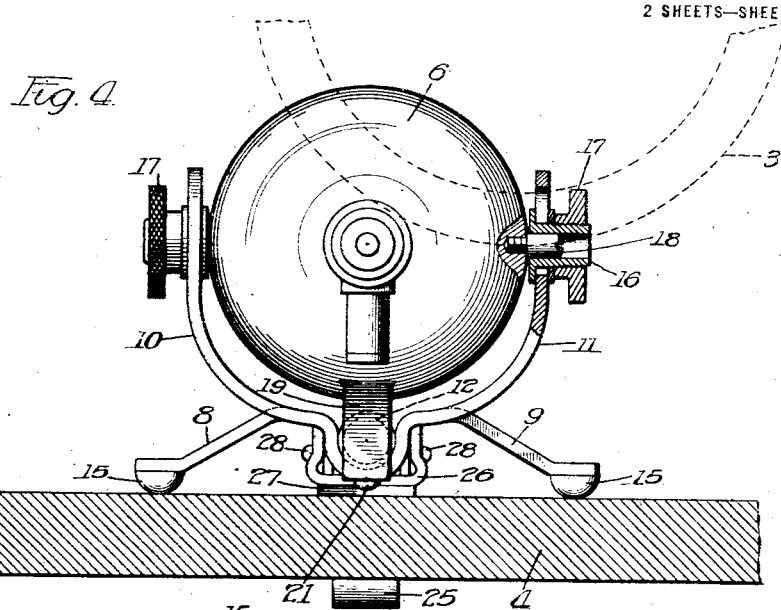
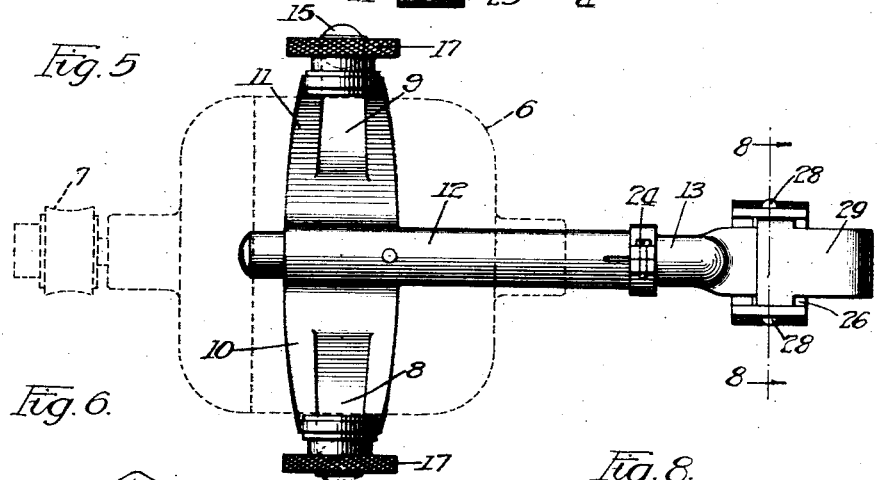
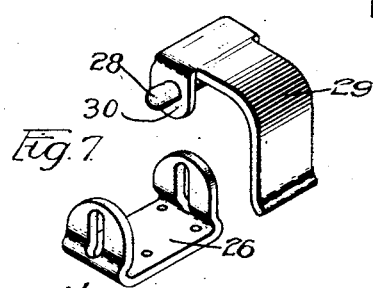
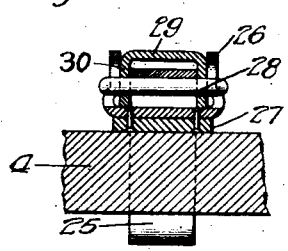
Witnesses:
Inventor:
Henry L. Zabriskie
Gustav C. Marx
Edwin B. H. Tower Jr.
Atty.

UNITED STATES PATENT OFFICE.

HENRY L. ZABRISKIE, OF WESTFIELD, AND GUSTAVE C. MARX, OF ELIZABETH, NEW JERSEY, ASSIGNORS TO DIEHL MANUFACTURING COMPANY, OF ELIZABETH, NEW JERSEY, A CORPORATION OF NEW JERSEY.

PORTABLE MOTOR-SUPPORT.

1,207,828.        Specification of Letters Patent.     Patented Dec. 12, 1916.

Application filed May 10, 1916. Serial No. 96,516.

*To all whom it may concern:*

Be it known that we, HENRY L. ZABRISKIE and GUSTAVE C. MARX, citizens of the United States, residing, respectively, at Westfield and at Elizabeth, both in the county of Union, State of New Jersey, have invented new and useful Improvements in Portable Motor-Supports, of which the following is a specification.

This invention relates to portable motor supports.

It relates particularly to supports for motors used to drive sewing machines.

In applying electric motors to sewing machines it is important that a support for the motor be provided which may be readily applied to various styles and makes of machines to support the motor in position to drive the machine. The support should be such that it can be quickly attached to the machine and removed therefrom. It should at the same time be simple, inexpensive and efficient. With these ends in view the present invention has been devised.

One of the objects of the invention is to provide an improved portable motor support.

Another object is to provide an improved motor support that can be quickly and easily applied to various machines.

A further object is to provide a motor support which may be readily applied to sewing machines by fastening it to the edge of the sewing machine table.

Other objects and advantages of the invention will hereinafter appear.

The accompanying drawings illustrate an embodiment of the invention.

The views of the drawings are as follows:

Figure 1 is a side elevation of the motor support applied to a sewing machine. Fig. 2 is a side elevation of the support applied to a machine having a double top. Fig. 3 is a side elevation and partial section of the motor support showing the details of construction. Fig. 4 is an end view of a motor and support therefor showing the construction of the motor pivot in section. Fig. 5 is a top plan view of the support showing the motor in dotted lines. Fig. 6 is a perspective view of the cam lever for operating the clamp for fastening the support to the edge of the table. Fig. 7 is a perspective view of the bearing block which forms a portion of the clamp. Fig. 8 is a cross section view through the clamp on the line 8—8 of Fig. 5.

A sewing machine with which the support may be used is shown in Fig. 1. It comprises a frame having a standard 1 and an arm 2. A fly wheel 3 connected to the driving shaft of the machine is located at one end of the frame. The frame is mounted on a table 4 which generally has a flat top. When the machine is operated by foot power it is driven by a belt 5 which runs in a groove in the hub of the fly wheel and over a wheel operated by treadle mechanism.

The motor for driving the machine comprises an electric motor 6 of any suitable type having a friction drive wheel 7 adapted to engage the rim of the sewing machine fly wheel 3 to drive it.

The motor support comprises a base or bracket having two feet 8 and 9 adapted to rest on a table top, a pair of arms 10 and 11 for supporting a motor, and a tubular body member 12 provided with an extension 13 having a cam operated clamp 14 for fastening it to the edge of a table. The feet 8 and 9 extend laterally in opposite directions and rest on the table top to provide a wide supporting base for the front end of the motor support. They are provided with rubber pads 15 to prevent damage to the finish of the table.

The arms 10 and 11 for supporting the motor project upwardly and are spaced apart so as to receive the motor between them. The upper ends of the arms carry bearings for pivotally supporting the motor. Each of the bearings comprises a sleeve 16 having a shank projecting through an opening in the arm and a shoulder adapted to bear against one side of the arm. The sleeve is held in position by means of a nut 17 screw threaded onto the exterior of the shank of the sleeve 16 and bearing against the arm on the side opposite that engaged by the shoulder of the sleeve 16, suitable washers being interposed. A pivot pin 18 is mounted within the sleeve 15 and screw threaded into the motor casing. The motor is thus pivoted to the arms 10 and 11 in a very simple manner. The openings through the arms for the reception of the bearings are elongated to form slots so that the position of the bearings may be changed to vary the position of the motor. This allows the motor to be easily adjusted to fit machines having fly wheels at different heights from the base. It is, of course, to be understood, that other suitable forms of bearings may be used if desired.

The motor is normally biased so that when it is placed in position adjacent a sewing machine fly wheel, the motor drive wheel is held in frictional engagement with the rim of the fly wheel. For this purpose the motor and its support are constructed as follows: The motor casing is provided with a projection 19 on its front lower end which is engaged by a spring pressed plunger 20 which biases the front end of the casing upwardly so that the motor drive wheel 7 is constantly maintained in yielding frictional engagement with the sewing machine fly wheel 3. The plunger 20 comprises a tubular member closed at one end and adapted to slide in the hollow front end of the body member 12 of the base. The movement of the plunger is limited by a screw 21 which projects from the stationary base into a slot in the plunger. A spiral spring 22 contained within the plunger 20 and bearing against its closed front end and against a pin or rivet 23 extending through the body member 12 serves to normally force the plunger forward into engagement with the projection 19 on the motor casing. The screw 21 and the rivet 23 also serve to connect the member 12 to the portion of the base connecting the two arms 10 and 11.

The extension 13 comprises a tubular member which telescopes with the body member 12. By varying the position of the extension 13 the motor support may be easily applied to machines of different makes in which the distance of the fly wheel from the edge of the table varies. It also enables the support to be applied to machines provided with a table having a double top such as shown in Fig. 2. The extension 13 is slotted at its inner end so that the rivet 23 will not interfere with its movement. It is held in position in the body member 12 by means of a clamp 24 which surrounds the outer end of said body member. The body 12 is slotted at its outer end in order that it may be forced into gripping engagement with the extension 13 when the clamp 24 is tightened.

The cam operated clamp 14 for fastening the extension to the edge of the table will now be described.

The outer end of extension 13 is flattened and bent to form a hook 25 adapted to pass over the edge of the table and engage the under side thereof. The shape of the flattened end of the extension is illustrated in Fig. 3. Surrounding the flattened end of the extension near the top outer edge of the table is a bearing block 26 adapted to rest on the table top for which purpose it is provided with a rubber pad 27. The block is formed from a strip of metal which is bent to form a flat base to which the pad 27 is attached and two upwardly extending arms having slotted openings therein. Mounted in the slotted openings in the bearing block 26 is a pin 28 which is carried by a clamping lever comprising a handle member 29 having a pair of ears 30 bent therefrom which carry the pin. The pin passes under the flattened end of extension 13, said extension being formed with a recess to receive the pin as illustrated in Fig. 3.

The ears 30 of the clamping lever 29 are rounded at their lower ends to form cams to engage the upper surface of the bearing block 26. The pin 28 is located in said ears so that the distance from the center line of said pin to the bottom of the ears is greater than the distance from the center line to the side of the ears. Accordingly, when the clamping lever is in the dotted line position shown in Fig. 3 with the sides of the ears engaging the block 26, the pin 28 is relatively close to the surface of block 26. As the lever is moved to the full line position, the distance of the center line of pin 28 from the surface of block 26 gradually increases due to the fact that the ears are turned from a position in which their sides engage the bearing block to a position where their ends engage it. During this movement the pin 28 moves in the slotted openings in the side of block 26. Movement of the lever thus tends to force the bearing block 26 down on the top of the table and to raise the pin 28 and with it the extension 13 which rests on top of the pin. Raising the extension 13 causes the hook portion 25 thereof to grip the under side of the table. The edge of the table is consequently gripped between the bearing block 26 and the hooked end 25 of the extension 13 when the lever 29 is moved to its full line position shown in Fig. 3. As the clamping lever is moved to its final position a toggle action is secured which holds the parts in clamped position, the point of bearing of the ears 30 on the block 26 passing across the line joining the point of bearing of pin 28 on extension 13 and the point of engagement of hook 25 with the lower side of the table. To release the clamp it is merely necessary to apply sufficient force to raise the lever 29 to break the toggle.

With the construction of motor support herein described it will be apparent that a motor can be readily applied to various makes of sewing machines by simply placing the support on the sewing machine table and clamping it to the edge thereof, the motor drive wheel being automatically maintained in frictional engagement with the sewing machine fly wheel. The position of the motor may be readily adjusted for fly wheels at different heights from the table. The support may be easily adjusted to fit tables of different lengths and constructions. The motor is rigidly supported in driving position and at the same time can be easily removed by simply loosening the clamp on the support.

It is to be understood that the embodiment shown is for purposes of illustration only and that other structures may be devised which embody the invention and come within the spirit and scope of the appended claims.

What we claim is:—

1. A portable support for sewing machine motors comprising a base adapted to support an electric motor and to rest on a sewing machine table, said base having means thereon adapted to be fastened to the edge of the table to hold the support in position.

2. A portable support for sewing machine motors comprising a base adapted to support an electric motor and to rest on a sewing machine table, said base having an extension provided with means adapted to be fastened to the edge of the table to hold the support in position.

3. A portable support for sewing machine motors comprising a base adapted to movably support an electric motor and to rest on a sewing machine table, means on said base for biasing the motor to driving position, said base having an extension thereon provided with means adapted to be fastened to the edge of the table to hold the support in position.

4. A portable support for sewing machine motors comprising a base adapted to rest on a sewing machine table, arms projecting from said base for pivotally supporting an electric motor, and an extension adjustably attached to said base having means on the outer end thereof for clamping it to the edge of said table.

5. A portable support for sewing machine motors comprising a base adapted to rest on a sewing machine table, arms projecting from said base for pivotally supporting an electric motor, means on said base for engaging the motor to normally bias it to a certain position and an extension adjustably attached to said base having means on the outer end thereof for clamping it to the edge of said table.

6. A portable support for sewing machine motors comprising a tubular body member, a pair of arms attached to said member for pivotally supporting an electric motor, feet integral with said arms adapted to rest on a sewing machine table, an extension member telescoping with said body member, and means on the end of said extension for clamping it to the edge of said table.

7. A portable support for sewing machine motors comprising a tubular body member, a pair of arms attached to said member for pivotally supporting an electric motor, feet integral with said arms adapted to rest on a sewing machine table, a spring pressed plunger in the front end of the body member for engaging the motor to bias it to a certain position and an extension member telescoping with said body member at the other end thereof, said extension having means on the outer end for clamping it to the edge of the sewing machine table.

8. A portable support for sewing machine motors comprising a base for supporting an electric motor, a member projecting from said base adapted to hook over the edge of a sewing machine table and engage the under side thereof, and means coöperating with said member adapted to clamp said table between itself and the portion of the member engaging the under side of the table.

9. A portable support for sewing machine motors comprising a base for supporting an electric motor, a member projecting from said base adapted to hook over the edge of a sewing machine table and engage the under side thereof, and cam operated means adapted to engage the top of said table and force said member upwardly to cause the portion beneath the table to engage the under side of the table whereby the table is clamped between the member and said means.

10. A portable support for sewing machine motors comprising a base for supporting an electric motor, a member projecting from said base adapted to hook over the edge of a sewing machine table and engage the under side thereof, a bearing block engaging the top of said table, and a cam member adapted to bear on said block and to engage the member projecting from said base to force said member upwardly to cause the table to be clamped between the block and the portion of the member which is adapted to engage the under side of the table.

11. A portable driving means for sewing machines comprising an electric motor, a base having means at its forward end for pivotally supporting said motor, the rear end of said base being provided with a clamp adapted to grip the edge of the sewing machine table.

12. A portable driving means for sewing machines comprising an electric motor, a base upon which said motor is mounted, and cam operated means for clamping said base to the edge of a sewing machine table.

13. A portable driving means for sewing machines comprising an electric motor, a base upon which said motor is pivotally mounted, cam operated means for clamping said base to the edge of a sewing machine table, and means for biasing the motor to driving position with relation to the sewing machine.

14. A portable driving means for sewing machines comprising an electric motor having a friction drive wheel, a base upon which said motor is movably mounted, cam operated means for clamping said base to the edge of a sewing machine table, and means for biasing said motor to driving position to cause its drive wheel to frictionally engage the fly wheel of a machine.

15. A portable driving means for sewing machines comprising an electric motor, a base upon which said motor is mounted, the forward end of said base being adapted to rest on the top of a sewing machine table, cam operated means on said base for clamping the rear end of said base to the edge of the table, and means for biasing the motor to driving position with relation to said machine.

16. The combination with a sewing machine of an electric motor and means for supporting the motor in driving relation to said machine, the forward end of said means being adapted to rest on the top of the sewing machine table and the rear end having a clamp for fastening it to the edge of the table.

17. The combination with a sewing machine of an electric motor and means for pivotally supporting the motor in driven relation to the machine, said means being adapted to rest on the top of the sewing machine table and having a cam operated clamp for fastening it to the edge of the table.

18. The combination with a sewing machine of an electric motor having a friction drive wheel, means for pivotally supporting the motor so that its drive wheel is in engagement with the fly wheel of the machine, said supporting means being adapted to rest on the top of the sewing machine table and having a clamp for fastening it to the edge of said table.

19. The combination with a sewing machine of an electric motor having a friction drive wheel, means for pivotally supporting the motor with its drive wheel adjacent the fly wheel of the machine, means for normally biasing said motor so that the drive wheel is maintained in yielding frictional engagement with the fly wheel of the machine, said means for supporting the motor being adapted to rest on the top of the sewing machine table and having means for clamping it to the edge of said table.

In witness whereof, we have hereunto subscribed our names in the presence of two witnesses.

HENRY L. ZABRISKIE.
GUSTAVE C. MARX.

Witnesses:
FREDERICK DIEHL,
JOHN H. BARKER.